United States Patent
Villermaux et al.

(10) Patent No.: US 8,376,318 B2
(45) Date of Patent: Feb. 19, 2013

(54) ZIRCONIA POWDER

(75) Inventors: Franceline Villermaux, Avignon (FR); Thibault Champion, Maubec (FR); Christian His, Cavaillon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 1 day.

(21) Appl. No.: 13/255,652

(22) PCT Filed: Mar. 10, 2010

(86) PCT No.: PCT/IB2010/051024
§ 371 (c)(1),
(2), (4) Date: Oct. 3, 2011

(87) PCT Pub. No.: WO2010/103463
PCT Pub. Date: Sep. 16, 2010

(65) Prior Publication Data
US 2012/0018007 A1 Jan. 26, 2012

(30) Foreign Application Priority Data
Mar. 10, 2009 (FR) ...................... 09 51484

(51) Int. Cl.
*C04B 35/626* (2006.01)

(52) U.S. Cl. .......................... 251/368; 501/103; 501/134

(58) Field of Classification Search .................. 251/368; 420/422; 501/103–104, 134–135
See application file for complete search history.

(56) References Cited

U.S. PATENT DOCUMENTS

| 2,335,325 | A | | 11/1943 | Wainer |
| 4,308,067 | A | | 12/1981 | Guigonis et al. |
| 4,420,142 | A | * | 12/1983 | Dworak et al. ............... 251/368 |
| 4,513,089 | A | | 4/1985 | Kummer et al. |
| 5,053,366 | A | | 10/1991 | Schoennahl |
| 7,405,173 | B2 | * | 7/2008 | Marlin et al. ................. 501/105 |
| 2003/0110708 | A1 | * | 6/2003 | Rosenflanz ................... 501/153 |
| 2009/0011215 | A1 | | 1/2009 | Muller et al. |
| 2009/0091051 | A1 | | 4/2009 | Champion et al. |

FOREIGN PATENT DOCUMENTS

| EP | 0 404 610 | 12/1990 |
| EP | 1 810 956 A1 | 7/2007 |
| FR | 2 894 957 | 6/2007 |
| GB | 1 528 148 | 10/1978 |

(Continued)

OTHER PUBLICATIONS

A.G. Karaulov et al., "Zirconia Ramming Compounds Tested in Induction Furnaces," Refractories and Industrial Ceramics, Mar. 1974, pp. 239-243, vol. 15, Springer, New York.

(Continued)

*Primary Examiner* — John Bastianelli
(74) *Attorney, Agent, or Firm* — Oliff & Berridge, PLC

(57) ABSTRACT

A powder including: (a) more than 92% of zircon particles; (b) 1% to 2% of silica particles having a size less than 50 microns; (c) 0.3% to 5% of particles comprising one, two, or three oxides selected from CaO, MgO, and $Y_2O_3$; (d) less than 1% of particles comprising other oxides; the powder also being such that it includes: more than 5% of zircon aggregate particles having a size greater than 1 mm; and 8% to 20% of zircon matrix particles having a size less than 15 μm and including, for more than 95% of the weight thereof, a monoclinic phase.

17 Claims, 1 Drawing Sheet

FOREIGN PATENT DOCUMENTS

WO  WO 84/00030  1/1984

OTHER PUBLICATIONS

A.G. Karaulov et al., "Thermal Insulation Powders of Monoclinic Zirconium Doixide," Refractories and Industrial Ceramics, Jul. 1989, pp. 448-450, vol. 30, Springer, New York.

Sep. 15, 2009 French Search Report issued in FR 0951484 (with translation).

May 20, 2010 International Search Report issued in PCT/IB2010/051024 (with translation).

* cited by examiner

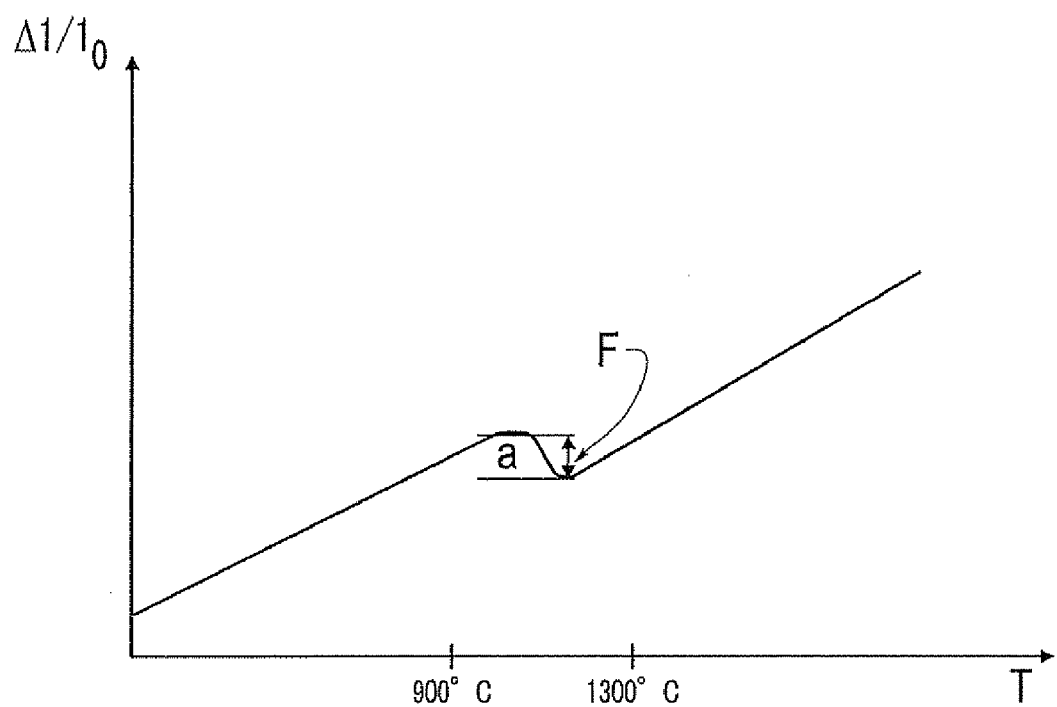

ZIRCONIA POWDER

FIELD OF TECHNOLOGY

This disclosure generally relates to a powder comprising more than 85% of zirconia, intended for the manufacture of sintered products. The disclosure also relates to a method of manufacturing said powder and to a sintered product obtained from said powder.

BACKGROUND

Sintered refractories with coarse grains joined together by a matrix and comprising more than 85 wt. % of zirconia are used in applications in which good mechanical strength and high corrosion resistance are required at temperatures above 1800° C. Such products are notably recommended in incineration, glassmaking, petrochemistry, in reactors for manufacturing carbon black and in the cement industry, for protection against attack by corrosive agents such as slag, glass, or dust-laden smoke.

The structure of these products, combining coarse grains and a matrix, contributes decisively to the mechanical properties. Zirconia-based products with a very homogeneous structure, obtained conventionally from powders of particles smaller than 50 microns, are therefore considered to be unsuitable for these applications.

Moreover, sintered refractories comprising more than 85 wt. % of zirconia and with coarse grains bound by a matrix rich in zirconia generally have low resistance to thermal shock. In fact, to facilitate sintering, which is made difficult by the presence of coarse grains, conventionally at least 1% of silica is added, which is considered to have a harmful effect on resistance to thermal shock.

Alternatively, within the glassmaking and metallurgical industries, EP 0 404 610 discloses products that have coarse grains bound by a matrix, the matrix being formed from a powder comprising less than 1% of silica, and preferably being more or less silica-free, but necessarily comprising monoclinic zirconia. Above 1%, silica in fact leads, according to this document, to elimination of the beneficial effect of the monoclinic zirconia. However, the low silica content makes sintering more difficult, notably when the coarse grains are of large dimensions.

There is therefore a need for a new sintered product with a coarse structure displaying good mechanical strength, good resistance to thermal shock and a thermal expansion behavior without any notable anomaly.

One aim of the embodiments of the present disclosure is to meet this need.

SUMMARY

In embodiments, the above aim is achieved by means of a powder consisting, to a total of 100%, in percentages by weight based on the oxides, of:

(a) more than 92% of zirconia particles, the powder comprising (with (a)=(a1)+(a2)):
  (a1) more than 60% of zirconia particles which size is larger than 50 microns, called "zirconia aggregate particles", at least 90 wt. % of said zirconia aggregate particles containing less than 50 wt % of monoclinic phase;
  (a2) more than 15% of zirconia particles which size is smaller than 50 μm, called "matrix particles of zirconia";

(b) 1 to 2% of silica particles which size is smaller than 50 microns, called "fine silica particles";

(c) 0.3% to 5% of particles consisting of one, two or three oxides selected from the group consisting of CaO, MgO and $Y_2O_3$, called "additional oxide particles", at least 55 wt. % of said additional particles having size being smaller than 50 μm;

(d) less than 1% of particles consisting of "other oxides", preferably selected from $Al_2O_3$, $TiO_2$, $Fe_2O_3$, $Na_2O$, and $K_2O$, the powder also being such that it comprises:

more than 5% of zirconia aggregate particles which size is larger than 1 mm and, preferably, smaller than 7 mm, or even smaller than 5 mm, and from 8 to 20% of matrix particles of zirconia having a size smaller than 15 μm and having, to more than 95% of their mass, a monoclinic phase, called "matrix particles of monoclinic zirconia".

Said powder, called "powder according to the invention", has a chemical composition and a granulometric distribution which lead, by sintering, to a refractory that more or less maintains its properties, and in particular good mechanical strength, in an application where it is subjected to high temperatures, thermal cycling and corrosive conditions.

Surprisingly, and contrary to the teaching of EP 0 404 610, this result is obtained despite the presence of more than 1% of silica. The inventors, without being bound by any theory, explain this phenomenon by the particular composition of fine fraction (fraction of particles smaller than 50 microns) of a powder according to the invention.

A powder according to the invention can further comprise one or more of the following optional characteristics:

The content by weight of zirconia $ZrO_2$ is above 87%, preferably above 90%, preferably above 92%.

The fraction (a) of the zirconia particles represents more than 95% of the weight of the powder.

The fraction (a1) of the zirconia aggregate particles represents more than 65%, more than 70% and/or less than 80%, or even less than 75% of the weight of the powder.

The powder comprises more than 60% of zirconia particles which size is smaller than 7 mm, or even smaller than 5 mm, and larger than 50 microns.

The powder comprises more than 50% of zirconia particles which size is smaller than 5 mm and larger than 50 microns.

More than 95% of the zirconia aggregate particles, or even more or less all the zirconia aggregate particles comprise less than 50 wt. % of monoclinic phase.

The zirconia of the zirconia aggregate particles that comprise less than 50 wt % of monoclinic phase is partially stabilized or fully stabilized with magnesia (MgO) and/or with lime (CaO). Preferably said zirconia is stabilized at least partly with magnesia, the content by weight of magnesia being between 2.9 and 4.5%;

The zirconia aggregate particles are fused particles.

The zirconia aggregate particles have a total porosity of less than 5 vol. %, preferably less than 2 vol. %.

The fraction (a2) represents more than 20% and/or less than 30%, or even less than 25% of the weight of the powder.

The powder comprises more than 10%, more than 15%, or even more than 20%, and/or less than 45%, less than 40%, less than 35%, or even less than 25% of zirconia aggregate particles which size is larger than 1 mm, and, preferably smaller than 7 mm, or even smaller than 5 mm.

The powder comprises more than 10%, more than 11% and/or less than 17%, less than 16%, or even less than 15% of matrix particles of monoclinic zirconia.

The matrix particles of monoclinic zirconia consist, to more than 99% of their weight, of zirconia.

The fraction (b) of fine silica particles represents more than 1.1% and/or less than 1.7%, less than 1.5%, or even less than 1.4% of the weight of the powder.

The median diameter of the fine silica particles is less than 10 µm, preferably less than 5 µm, preferably less than 2 µm, more preferably less than 1 µm.

The fine silica particles are obtained from fumed silica.

The fraction (c) of additional oxide particles represents more than 0.5%, more than 1.0%, more than 1.5% and/or less than 3.0%, less than 2.5%, preferably less than 2%, or even less than 1.0% of the weight of the powder.

The additional oxide particles comprise $Y_2O_3$ particles or, preferably, $Y_2O_3$ particles and MgO particles;

The powder comprises more than 0.2%, more than 0.3%, or even more than 0.4% and/or less than 0.8%, less than 0.7%, or even less than 0.6% of $Y_2O_3$ particles and more than 0.9%, more than 1.0%, or even more than 1.1% and/or less than 1.5%, less than 1.4%, or even less than 1.3% of MgO particles.

In the additional oxide particles, one or more of the oxides CaO, MgO and $Y_2O_3$ is replaced, partially or completely, with an equivalent molar amount of a precursor. Preferably, however, said oxides are present in the form of oxides and not in the form of precursors.

More than 95%, preferably approximately 100 wt. % of the CaO particles and of the $Y_2O_3$ particles have sizes smaller than 50 µm, preferably smaller than 20 µm.

Embodiments of the present disclosure also relate to a sintered product obtained from a powder according to the invention.

Said product can be used in particular as a lining element, for example for protecting a metal structure from a corrosive environment, at temperatures above 1800° C. These embodiments therefore further relate to said use, said lining element and a metal structure protected by said lining element.

Other characteristics and advantages of the present invention will become evident on reading the detailed description given below and on examining the appended drawing in which FIG. 1 shows an example of expansion break.

BRIEF DESCRIPTION OF THE DRAWINGS

FIG. 1 shows an example of expansion break.

DEFINITIONS

"Zirconia particles" and "silica particles" are particles consisting, to at least 90%, preferably to at least 95%, preferably approximately 100%, of their weight, of zirconia and of silica, respectively.

The term "particles consisting of one, two or three oxides selected from the group consisting of CaO, MgO and $Y_2O_3$" means a set of particles in which all the particles consist of the same oxide, or comprise particles of a first of said oxides and particles of a second of said oxides, or comprise particles of a first of said oxides, particles of a second of said oxides and particles of a third of said oxides. It is not envisaged that a particle can consist of a mixture of several of said oxides. It is to be understood by "consist of an oxide" that the content by weight of said oxide is greater than 90%, or even greater than 95%, or, even, preferably, approximately 100%.

"Zirconia" means zirconium oxide $ZrO_2$ and traces of $HfO_2$, chemically inseparable from $ZrO_2$, and always naturally present in sources of $ZrO_2$. These traces of $HfO_2$ classically represent less than 2% of the weight of "zirconia". When reference is made to $ZrO_2$ or to $ZrO_2+HfO_2$, this is therefore to be understood as: $ZrO_2$+traces of $HfO_2$. The hafnium oxide is not regarded as an impurity.

"Monoclinic zirconia" is a zirconia that is, for more than 95% of its mass, in the monoclinic crystallographic phase. The monoclinic crystallographic phase is determined by X-ray diffraction. The monoclinic zirconias used can be of any origin, for example chemical, or electromelted.

"Stabilized and/or partially stabilized zirconia" means a zirconia with less than 50% of its mass in the monoclinic crystallographic phase. The other crystallographic phases present are the cubic phase and the quadratic phase.

"Matrix particle" means a fine particle which, during sintering, will constitute a matrix, generally continuous, surrounding the coarse particles, or "particles of aggregate".

A product is conventionally called "fused" when it is obtained by a method employing fusion of raw materials and solidification by cooling.

A precursor of CaO, MgO or $Y_2O_3$ is a compound that is able, during sintering of a green part obtained from a powder according to the invention, to lead to the oxides CaO, MgO or $Y_2O_3$, respectively. For example, a precursor of lime CaO is calcium carbonate. Thus, when, in the additional oxide particles, one or more of the oxides CaO, MgO and $Y_2O_3$ is replaced, partially or completely, with an equivalent molar amount of a precursor, this replacement does not alter the amounts of said oxides in the sintered product obtained by sintering a powder according to the invention. A precursor of an oxide is supplied in a molar amount equivalent to an amount of said oxide when sintering said equivalent molar amount of said precursor leads to said amount of oxide.

"Grain size" means the size of a particle, given classically by characterization of the granulometric distribution performed using a laser granulometer. The laser granulometer used here is a PARTICA® LA-950 from the company HORIBA®.

"Impurities" means the inevitable constituents introduced unintentionally and necessarily with the raw materials or resulting from reactions with said constituents. The impurities are not required constituents, but are merely tolerated. For example, the compounds forming part of the group comprising oxides, nitrides, oxynitrides, carbides, oxycarbides, carbonitrides and metallic species of sodium and other alkalies, iron, vanadium and chromium are impurities if their presence is not desired.

Unless stated otherwise, all percentages are percentages by weight.

DETAILED DESCRIPTION OF EMBODIMENTS

A powder according to the invention is intended to be sintered to constitute a sintered product.

It comprises a coarse fraction, notably comprising the fraction (a1), and a fine fraction notably comprising the fractions (a2)+(b)+(c).

The coarse fraction, or "aggregates", consists of the aggregate particles which for the most part will be more or less preserved during sintering to constitute the "coarse grains" of the sintered product. In embodiments, the fraction consists of zirconia particles in order to endow the sintered product with high mechanical strength at very high temperatures. In embodiments, this coarse fraction should represent more than 60% of the powder.

To improve the resistance to thermal shock, the inventors consider it advantageous for more than 5 wt. %, preferably more than 10 wt. %, or even more than 15 wt. %, or even more than 20 wt. % of the particles to be particles of zirconia aggregates having a size larger than 1 mm and, preferably, smaller than 7 mm, or even smaller than 5 mm.

Preferably, 95%, or even approximately 100% of the zirconia of the coarse fraction is at least partly stabilized, preferably with magnesia (MgO) and/or with lime (CaO). Advantageously, for a product obtained by shaping and sintering a powder according to the invention, thermal expansion breaks are reduced.

Preferably, the total porosity of the particles of the coarse fraction is less than 5%, preferably less than 2%. Advantageously, these particles have greater thermal stability. Thus, they have a lower probability of undergoing irreversible shrinkage during use. Moreover, they are thus more resistant to corrosion, as they have a smaller surface area exposed to aggressive species.

It is further preferable for the aggregate particles to be fused particles. Advantageously, this manufacturing technique makes it possible to obtain particles with the preferred level of porosity.

The fine fraction consists of particles which will for the most part be transformed during sintering into a matrix binding said coarse grains. The fine fraction of a powder according to the invention has a particular composition:

The fine fraction must comprise matrix particles of zirconia representing more than 15% of the weight of the powder. This zirconia content contributes, with the coarse fraction, to endowing the sintered product with high mechanical strength at very high temperatures. According to the teaching of EP 0 404 610, at least a proportion of the matrix particles of zirconia must consist of matrix particles of monoclinic zirconia in order to endow the sintered product with good resistance to thermal shock. More precisely, the powder must comprise from 8 to 20% of matrix particles of monoclinic zirconia. This condition is a supplementary condition to the condition according to which more than 15% of the powder consists of matrix particles of zirconia and must of course be compatible with this last-mentioned condition.

Contrary to the teaching of document EP 0 404 610 and to a prejudice according to which addition of silica always results in limiting, or even eliminating the beneficial effect from the introduction of matrix particles of monoclinic zirconia on the resistance to thermal shock, a powder according to the invention also comprises from 1 to 2% of fine silica particles (b) and from 0.3% to 5% of additional oxide particles (c). The fractions (b) and (c) improve the sintering, and endow the sintered product with good mechanical strength, notably good cold compressive strength and a good modulus of rupture.

The best results were obtained on adding, as additional oxide particles, $Y_2O_3$ particles and MgO particles.

The fraction (d), constituting the complement to 100% of a powder according to the invention, is not limiting. The inventors in fact consider that the amount of fraction (d) is sufficiently small so that, regardless of the granulometric distribution or the chemical nature of this fraction, it does not cancel the advantageous results obtained. Preferably, however, this fraction consists of impurities of raw materials, such as $Al_2O_3$, $TiO_2$, $Fe_2O_3$, $Na_2O$, $K_2O$.

Zircon also forms part of the "other oxides".

Embodiments of the present disclosure also relate to a method of preparing a powder according to the invention comprising the following steps:

a) selecting a "source of zirconia aggregate particles" comprising at least 30 wt. % of zirconia aggregate particles, at least 90 wt. % of said zirconia aggregate particles containing less than 50 wt. % of monoclinic phase;
b) selecting a "source of matrix particles of zirconia" comprising at least 50 wt. % of matrix particles of zirconia;
c) selecting a "source of matrix particles of monoclinic zirconia" comprising more than 50 wt. % of matrix particles of monoclinic zirconia;
d) selecting a "source of fine silica particles" comprising at least 87%, preferably at least 90 wt. % of fine silica particles;
e) selecting a source of additional oxide particles comprising at least 87%, preferably at least 90 wt. % of additional oxide particles;
the sources selected in steps a), b) and c) each comprising at least 87%, preferably at least 90 wt. % of zirconia; and
f) preparing a powder comprising, in percentages by weight:
   at least 60% of said source of zirconia aggregate particles, the amount of said source of zirconia aggregate particles being moreover determined so that said powder comprises more than 5 wt. % of zirconia aggregate particles which size is larger than 1 mm and, preferably smaller than 7 mm, or even smaller than 5 mm, and;
   between 8 and 31% of said source of matrix particles of monoclinic zirconia;
   1% to 2% of said source of fine silica particles;
   0.3% to 5% of said source of additional oxide particles; and
   the complement to 100% being said source of matrix particles of zirconia.

The sources can be selected so as to prepare a powder further displaying one or more of the characteristics of a powder according to the invention.

Embodiments of the present disclosure also relate to a powder prepared by a method in accordance with the present disclosure.

"Selecting a source" means "selecting one or more sources".

Of course, steps a) to e) can be apart or grouped together, for example if there is a source of raw materials corresponding to one or more of said sources. In one embodiment, the sources, and in particular sources b) and c) are different.

In step f), the choice of the source of zirconia aggregate particles and the amount of said source are adapted so that the powder prepared comprises more than 5 wt. % of zirconia aggregate particles which size is larger than 1 mm and, preferably, smaller than 7 mm, or even smaller than 5 mm. For example, if this source mainly consists of said aggregate particles, the amount thereof can be close to or equal to 60%. Conversely, this amount will have to be greater than 60% if said source only comprises a small amount of said aggregate particles.

The sources mentioned above can further have one or more of the following optional characteristics:

The source of zirconia aggregate particles is a source of zirconia at least partly, or even fully stabilized with magnesia (MgO) and/or with lime (CaO). Preferably said zirconia aggregates are partially stabilized with a content by weight of magnesia between 2.9 and 4.5%;
In step f), at least 65%, preferably at least 70% of said source of zirconia aggregate particles is added;
In step f), the amount of said source of zirconia aggregate particles is determined so that said powder comprises more than 10%, or even more than 15%, or even more than 20%, or even more than 30 wt. % of zirconia aggregate particles which size is larger than 1 mm and, preferably, smaller than 7 mm, or even smaller than 5 mm;

The source of zirconia aggregate particles gives a zirconia content, by weight, greater than 94%;

The source of zirconia aggregate particles is a source of fused zirconia;

The source of zirconia aggregate particles is selected so that the aggregate particles have a total porosity less than 5 vol %, preferably less than 2 vol. %;

The source of matrix particles of monoclinic zirconia consists to more than 99 wt. % of zirconia;

In step f), at least 11% of said source of matrix particles of monoclinic zirconia is added;

In step f), at least 5% of the source of matrix particles of zirconia is added;

The source of matrix particles of monoclinic zirconia is a source where at least 90% of the particles by weight have size smaller than 15 μm Preferably, between 4 and 10 wt. % of said source of matrix particles of monoclinic zirconia, where at least 90 wt. % of the particles have size smaller than 15 μm, is added in step f);

The source of matrix particles of zirconia is a source of zirconia that is partially stabilized, or even stabilized. Preferably, said matrix particles of zirconia are partially stabilized, the content by weight of magnesia being between 2.9% and 4.5%;

The source of additional oxide particles is selected so that more than 95%, preferably approximately 100 wt. % of said additional oxide particles have size smaller than 50 μm, preferably smaller than 20 μm;

During preparation of the powder, the amount of the source of additional oxide particles used is greater than 0.5%, preferably greater than 1%, and/or less than 3%, preferably less than 2%;

The source of additional oxide particles is a source of $Y_2O_3$ or, preferably, a source of $Y_2O_3$ and of MgO;

In step f), more than 0.2% and less than 0.8% of the source of $Y_2O_3$ and more than 0.9% and less than 1.5% of the source of MgO is added; Preferably, 0.5% of the source of $Y_2O_3$ and 1.2% of the source of MgO are added;

One source of additional oxide particles is a source of precursors of said oxides. Preferably however, the source of additional oxide particles is a source of oxides;

At most 1.5% of the source of fine silica particles is introduced during preparation of the powder;

Said source of fine silica particles is fumed silica.

Embodiments of the present disclosure further relate to a particulate mixture comprising from 0 to 6 wt. % of a molding additive and, as the complement to 100%, of a powder according to the invention.

This additive can in particular be selected from the group comprising:
clays;
plasticizers, such as PEG or PVA;
binders including temporary organic binders such as resins, lignosulfonates, carboxymethylcellulose or dextrin;
deflocculants, such as alkali metal polyphosphates, alkali metal polyacrylates; and
mixtures of these products.

Preferably, said additive is a calcium lignosulfonate.

Embodiments of the present disclosure further relate to a method of manufacturing a sintered refractory, comprising the following successive steps:
A) preparing a particulate mixture in accordance with the present disclosure with water to form a feed material,
B) molding said feed material so as to form a green part;
C) sintering said green part.

In step A), the amount of water depends on the method used in step B). In the case of molding by cold pressing, addition of an amount of water between 1.5% and 2.5%, as percentage by weight based on the powder (i.e. based on the particulate mixture without additive) is preferred.

In one embodiment, no surfactant is added for molding the feed material.

In step C), the sintering conditions and in particular the sintering temperature, depend on the precise composition of the fine fraction (consisting of fine particles) of the particulate mixture. Usually, a sintering temperature between 1500° C. and 1900° C., preferably of 1700° C. is very suitable.

Embodiments of the present disclosure also relate to a sintered refractory obtained by sintering a green part obtained from a powder according to the invention, from a powder manufactured by a method in accordance with the present disclosure or from a particulate mixture in accordance with the present disclosure in particular following steps A) to C) below.

This method makes it possible, advantageously, to manufacture a sintered refractory in accordance with the present disclosure having an apparent density between 4.1 and 4.9 g/cm$^3$, preferably between 4.4 and 4.9 g/cm$^3$.

In the sintered refractory resulting from step C), the additional oxide particles can notably combine with one another and/or with the fine silica particles, notably in the form of silicates, for example yttrium silicate.

In embodiments, a sintered product of the present disclosure can be used as blocks or as a layer, for example in the form of a lining applied, by any known method, on a wall to be protected. Sintering can be carried out in situ, i.e. after the product has been arranged in its working position.

In one embodiment, all the external dimensions of a block according to of the present disclosure are greater than 1 cm, greater than 2 cm, greater than 5 cm, or even greater than 10 cm.

Another embodiment relates in particular to an installation comprising:
a wall and a barrier protecting said wall; and/or
means for directing a flow of a liquid, for example a nozzle, or for hindering said flow, for example a drawer-type plate,
said barrier or said means for directing or hindering said flow comprising a refractory in accordance with the present disclosure.

The liquid can notably be a molten metal, for example steel.

In one embodiment, the liquid is at a temperature above 1400° C., or even above 1500° C., or even above 1600° C.

The refractory of the present disclosure can notably be arranged in contact with an environment that may be corrosive and/or that may create a thermal shock, in particular such that the temperature varies, during the thermal shock, by at least 750° C. in less than 1 minute, or even by at least 1000° C. in less than a minute, or even by at least 1500° C. in less than a minute. The thermal shock can be ascending, i.e. such that the origin of the thermal shock is a temperature rise. The thermal shock can also be descending, i.e. such that the origin of the thermal shock is a temperature drop.

Embodiments of the present disclosure relate in particular to an installation selected from a corium tank, notably for a pressurized-water reactor, a reactor for manufacturing carbon black, in particular a combustion chamber of said reactor, equipment for the metallurgical industry, such as a melting furnace, a transfer ladle, a treatment ladle, a pouring device, in particular a drawer-type plate, or a nozzle of said equipment, an incinerator, a glassmaking furnace, a petrochemical reactor and a cement kiln.

EXAMPLES

The following nonlimiting examples are given for the purpose of illustrating various features of the present disclosure.
Characteristics
Measurement of Resistance to Thermal Shock The relative loss of bending strength as a result of thermal shock is a characteristic of a product by which its capacity to withstand such shock can be evaluated.

The standardized test PRE III.26/PRE/R.5.1/78 was used for determining the thermal shock behavior as the relative loss of bending strength (% Loss MOR) after one or more cycles each consisting of heating the test specimen from room temperature up to a temperature of 1200° C., holding the test specimen at this temperature T for 30 minutes, then plunging the test specimen into cold water.

The test specimens are bars with the dimensions 125×25×25 mm$^3$ without any skin face.

The bending strength was measured according to standard ISO 5014. For a given composition, measurement of the initial bending strength of the test specimens (not submitted to thermal shock), "MOR initial" is the mean value measured on 3 identical test specimens; measurement of the strength after thermal shock at 1200° C., "MOR after TS" is the mean value of the bending strength measured at room temperature on 3 test specimens after they have undergone said thermal shock; measurement of the relative loss of bending strength, "% Loss MOR" is given by the following formula:

% Loss $MOR$=100·($MOR$ after $TS$–$MOR$ initial)/($MOR$ initial)

Measurement of the Amplitude of the Expansion Break

The coefficients of thermal expansion were measured on cylindrical specimens with a diameter of 12 mm and a height of 15 mm. Each measurement was carried out by means of a SETSYS Evolution TMA 16/18 dilatometer with equipment made of alumina, marketed by the company SETARAM. The expansion is measured by means of a hemispherical stylus, applying a load of 5 g. The rate of temperature increase is 4° C./min, up to a temperature of 1600° C. The temperature is then lowered at a rate of 4° C./min. The entire cycle is carried out under an air flow of 20 ml/min.

The curve of thermal expansion, as shown in FIG. 1, is found to have an "expansion break". The amplitude "a" of this break is the difference between the maximum before shrinkage and the minimum before resumption of expansion, measured between 900° C. and 1300° C., on the section of the expansion curve corresponding to the temperature rise. In FIG. 1, the temperature T in ° C. is on the abscissa, and the thermal expansion $\Delta l/l_0$ in % is on the ordinate. The expansion break is marked with the arrow F.
Measurement of Apparent Density after Sintering The apparent densities after sintering were measured on specimens with the dimensions 125×25×25 mm$^3$, according to standard ISO 5017.
Measurement of Porosity of Aggregates The apparent density Dap of the aggregate particles was determined according to standard ISO 8840 of 1987 with the following modification: the particles used have a size between 2 and 5 mm.

The absolute density Dab was measured following the Accupic 1330 procedure marketed by the company Micromeritics, on a product ground to a size of less than 160 microns.

The total porosity of the particles, Po, is calculated from the following formula:

$Po=(Dab-Dap)/Dab$

The following raw materials were used in the examples:
The monoclinic zirconia powder used in the matrix is "Z-99 3-5 μm" zirconia, marketed by the company Unitec Ceramics, which has a content by weight of $ZrO_2+HfO_2$ greater than 98.3%, and a median diameter between 3 and 5 microns;
The fumed silica used in the matrix is thermal silica consisting essentially of microspheres of vitreous silica with 90% of particles smaller than 4 μm, the median diameter of the particles being typically 0.5 μm. It has a B.E.T. standard specific surface of 14 m$^2$/g, a typical silica content by weight of 93.5%, a typical content of $Al_2O_3$ of 3.5% and a typical content of $ZrO_2+HfO_2$ of 2.4%;
Zirconia particles partially stabilized with magnesia are particles of "fused magnesia stabilized zirconia" marketed by the company Unitec Ceramics, which have a content by weight of $ZrO_2+HfO_2$ greater than 94.3% and a MgO content by weight between 2.9 and 4.4%;
Zirconia particles partially stabilized with lime are particles of "fused calcia stabilized zirconia", marketed by the company Unitec Ceramics, which have a content by weight of $ZrO_2+HfO_2$ greater than 93.9% and a CaO content by weight between 3.7% and 4.8%;
The monoclinic zirconia powder −300 Mesh used is "zirconia Z-99" powder marketed by the company Unitec Ceramics, in which the content by weight of $ZrO_2+HfO_2$ is greater than 98.3%, and in which at least 92% of the particles are smaller than 50 microns.
The CaO powder used in the matrix is a powder of slaked lime, marketed by the company La Gloriette, containing more than 97% of CaO (amount measured after loss on ignition at 1000° C.) and with particles smaller than 50 μm.
The MgO powder used in the matrix is a "MAGCHEM® P98 Pulverised" powder, marketed by the company M.A.F. Magnesite B.V., containing more than 97.5% of magnesia and with at least 60% of particles smaller than 44 microns;
The $Y_2O_3$ powder used in the matrix is a powder of "yttrium oxide" marketed by the company Treibacher, containing more than 98.9% of yttrium oxide and whose median diameter is less than 10 microns;
The clay used is clay RR40;
The calcium lignosulfonate used is WAFEX 122, marketed by the company Holmen LignoTech.

The oxide powders are mixed with a molding additive (1% of clay RR40 for examples 1 to 4 or 0.5% of calcium lignosulfonate for the other examples) and 2% of water, in percentages based on the mixture of oxide powders. The moist mixture is then compacted into bricks of dimensions 230×114×64 mm$^3$ on a single-acting mechanical press at a pressure of 720 kg/cm$^2$.

These bricks were then sintered at a plateau temperature of 1700° C., with holding at the plateau for 5 hours, the rate of increase being 50° C./h. After the temperature plateau, the temperature was lowered, the rate of decrease being 50° C./h to 800° C., then with a free temperature decrease to room temperature.

The following tables summarize the tests and the results obtained.

Examples 1 to 4, and 14 are comparative examples that do not meet these three criteria simultaneously.

TABLE 1

|  | Grain size distribution (*) | Ex 1 | Ex 2 | Ex 3 | Ex 4 | Ex 5 | Ex 6 | Ex 7 | Ex 8 | Ex 9 | Ex 10 | Ex 11 | Ex 12 | Ex 13 | Ex 14 | Ex 15 | Ex 16 |
|---|---|---|---|---|---|---|---|---|---|---|---|---|---|---|---|---|---|
| Zirconia partially stabilized with CaO | 1.68-4 mm | 0 | 48 | 49 | — | — | — | — | — | — | — | — | — | — | — | — | — |
|  | 0.59-1.68 mm | 35 | 8 | 8 | — | — | — | — | — | — | — | — | — | 52 | — | — | — |
|  | 0.149-0.59 mm | 30 | 17 | 17 | — | — | — | — | — | — | — | — | — | 10 | — | — | — |
|  | <0.149 mm | 20 | — | — | — | — | — | — | — | — | — | — | — | — | — | — | — |
|  | <0.05 mm | 15 | 17 | 19 | — | — | — | — | — | — | — | — | — | 10 | — | — | — |
| Zirconia partially stabilized with MgO | 1.68-4 mm | — | — | — | 36 | 36 | 36 | 36 | 36 | 36 | 36 | 38 | 18 | — | — | — | — |
|  | 0.59-1.68 mm | — | — | — | 9 | 9 | 9 | 9 | 9 | 9 | 9 | 9 | 29 | — | 55 | 55 | 55 |
|  | 0.149-0.59 mm | — | — | — | 26 | 26 | 26 | 26 | 26 | 26 | 26 | 27 | 27 | — | 10 | 10 | 10 |
|  | <0.149 mm | — | — | — | — | — | — | — | — | — | — | — | — | — | 17.8 | 17.8 | 17.8 |
|  | <0.05 mm | — | — | — | 5 | 5 | 5 | 5 | 5 | 5 | 5 | 5 | 5 | — | 5 | 5 | — |
| Monoclinic zirconia | <0.05 mm | 0 | 5 | 5 | 17.8 | 17.3 | 16.6 | 17.3 | 12.8 | 12.8 | 12.8 | 13.1 | 13.1 | 15.6 | 9.3 | — | 9.3 |
| Monoclinic zirconia | 3.5-5 μm | 0 | 0 | 2 | 5 | 5 | 5 | 5 | 5 | 5 | 5 | 5 | 5 | 9 | — | 9.3 | 5 |
| Y$_2$O$_3$ powder (%) |  | 0 | 5 | 0 | 0 | 0.5 | 0 | 0 | 5 | 0 | 0 | 0.5 | 0.5 | 0.5 | 0.5 | 0.5 | 0.5 |
| MgO powder (%) |  | 0 | 0 | 0 | 0 | 0 | 1.2 | 0 | 0 | 5 | 0 | 1.2 | 1.2 | 0 | 1.2 | 1.2 | 1.2 |
| CaO powder (%) |  | 0 | 0 | 0 | 0 | 0 | 0 | 0.5 | 0 | 0 | 5 | 0 | 0 | 1.2 | 0 | 0 | 0 |
| Fumed silica |  | 0 | 0 | 0 | 1.2 | 1.2 | 1.2 | 1.2 | 1.2 | 1.2 | 1.2 | 1.2 | 1.2 | 1.7 | 1.2 | 1.2 | 1.2 |
| Total |  | 100 | 100 | 100 | 100 | 100 | 100 | 100 | 100 | 100 | 100 | 100 | 100 | 100 | 100 | 100 | 100 |

(*) as stated, in Mesh or in mm, on the packaging of the raw material in question

TABLE 2

|  | Ex 1 | Ex 2 | Ex 3 | Ex 4 | Ex 5 | Ex 6 | Ex 7 | Ex 8 | Ex 9 | Ex 10 | Ex 11 | Ex 12 | Ex 13 | Ex 14 | Ex 15 | Ex 16 |
|---|---|---|---|---|---|---|---|---|---|---|---|---|---|---|---|---|
| Zirconia particles (a) (%) | 100 | 95 | 100 | 98.8 | 98.3 | 97.6 | 98.3 | 93.8 | 93.8 | 93.8 | 97.1 | 97.1 | 96.6 | 97.1 | 97.1 | 97.1 |
| Zirconia aggregate particles (a1) (%) | 69 | 73 | 74 | 71 | 71 | 71 | 71 | 71 | 71 | 71 | 74 | 74 | 62 | 68.6 | 68.6 | 68.6 |
| Zirconia aggregate particles with size smaller than 7 mm and larger than 1 mm (%) | 3.5 | 47.8 | 48.8 | 36.2 | 36.2 | 36.2 | 36.2 | 36.2 | 36.2 | 36.2 | 38.1 | 20.5 | 5.2 | 5.5 | 5.2 | 5.2 |
| Zirconia matrix particles (a2) (%) | 31 | 22 | 26 | 27.8 | 27.3 | 26.6 | 27.3 | 22.8 | 22.8 | 22.8 | 23.1 | 23.1 | 34.6 | 28.5 | 28.5 | 28.5 |
| Matrix particles of monoclinic zirconia (%) | 0 | 3 | 5 | 15.7 | 15.4 | 15 | 15.4 | 12.7 | 12.7 | 12.7 | 12.9 | 12.9 | 18.4 | 5.6 | 9.3 | 10.6 |
| Fine silica particles (b) (%) | — | — | — | 1.2 | 1.2 | 1.2 | 1.2 | 1.2 | 1.2 | 1.2 | 1.2 | 1.2 | 1.7 | 1.2 | 1.2 | 1.2 |
| Additional oxide particles (c) (%) | — | 5 | — | — | 0.5 | 1.2 | 0.5 | 5 | 5 | 5 | 1.7 | 1.7 | 1.7 | 1.7 | 1.7 | 1.7 |
| Chemical analysis after sintering at 1700° C. | | | | | | | | | | | | | | | | |
| ZrO$_2$ + HfO$_2$ (%) | 95.1 | 90.7 | 95.6 | 95 | 94.5 | 93.8 | 94.5 | 90 | 90.1 | 90.2 | 93.2 | 93.1 | 93.1 | 92.6 | 92.5 | 92.8 |
| CaO (%) | 4 | 3.5 | 3.6 | 0.1 | 0.1 | 0.1 | 0.6 | 0.1 | 0.15 | 5 | 0.1 | 0.1 | 4 | 0.1 | 0.1 | 0.1 |
| MgO (%) | <0.1 | <0.1 | <0.1 | 3.1 | 3.1 | 4.3 | 3.1 | 3.1 | 8 | 3.1 | 4.4 | 4.3 | <0.1 | 4.7 | 4.7 | 4.5 |
| Y$_2$O$_3$ (%) | <0.1 | 5 | <0.1 | <0.1 | 0.5 | <0.1 | <0.1 | 5 | <0.1 | <0.1 | 0.5 | 0.5 | 0.5 | 0.5 | 0.5 | 0.5 |
| SiO$_2$ (%) | 0.21 | 0.18 | 0.19 | 1.21 | 1.2 | 1.22 | 1.2 | 1.2 | 1.24 | 1.2 | 1.21 | 1.22 | 1.75 | 1.24 | 1.25 | 1.24 |
| Al$_2$O$_3$ (%) | 0.21 | 0.17 | 0.18 | 0.23 | 0.22 | 0.24 | 0.23 | 0.22 | 0.22 | 0.22 | 0.23 | 0.22 | 0.25 | 0.23 | 0.24 | 0.23 |
| Others (%) | <0.4 | <0.4 | <0.5 | <0.5 | 0.5 | <0.5 | <0.5 | 0.5 | <0.4 | <0.5 | <0.5 | <0.6 | <0.4 | <0.7 | <0.7 | <0.7 |
| Results | | | | | | | | | | | | | | | | |
| Apparent density (g/cm$^3$) | 4.56 | 4.64 | 4.74 | 4.57 | 4.63 | 4.72 | 4.62 | 4.46 | 4.49 | 4.26 | 4.71 | 4.62 | 4.65 | 4.63 | 4.71 | 4.67 |
| Three-point bending modulus of rupture at 20° C. (MPa) | 11 | 15 | 4 | 10 | 13 | 20 | 13 | 8 | 9 | 8 | 17.6 | 16 | 7 | 13 | 12.4 | 10 |
| % Loss MOR before/after thermal shock at 1200° C. (%) | 80 | 87 | 62 | 64 | 57 | 70 | 69 | 65 | 75 | 69 | 65 | 55 | 70 | 80 | 73 | 68 |
| "Expansion break" (%) | — | 0.00 | — | 0.25 | 0.20 | 0.20 | 0.05 | 0.10 | 0.06 | 0.00 | 0.04 | 0.02 | 0.06 | 0.01 | 0.02 | 0.03 |

It is considered that a good compromise between three-point bending modulus of rupture at 20° C., resistance to thermal shock, and absence of expansion anomaly is obtained when the following three criteria are observed:
(1) three-point bending modulus of rupture at 20° C. greater than or equal to 7 MPa, preferably greater than 10 MPa;
(2) MOR loss below 79%, preferably below 70%, more preferably below 65%;
(3) percentage of expansion breaks less than 0.22%, preferably less than 0.1%, more preferably less than 0.05%.

Comparison of examples 1 and 2 shows the effect of introducing additional oxide particles on the mechanical strength measured at 20° C., despite presence of 3% of matrix particles of monoclinic zirconia. Comparison of examples 2 and 3 shows that, without the presence of additional oxide particles and without the presence of fine silica particles, adding 5% of matrix particles of monoclinic zirconia leads to a deterioration of mechanical strength at 20° C. and an improvement in resistance to thermal shock.

Example 14 shows that addition of 5.6% of matrix particles of monoclinic zirconia does not meet criterion (2). That is why the present disclosure recommends a minimum content of matrix particles of monoclinic zirconia of 8%.

Example 13 shows that the effect of the matrix particles of monoclinic zirconia remains limited and that a large addition can even cause a deterioration of mechanical strength at 20° C., despite a high silica content. That is why the present disclosure recommends a maximum content of matrix particles of monoclinic zirconia of 20%. Above this value, the inventors believe that the aforementioned compromise between mechanical strength at 20° C., resistance to thermal shock and absence of expansion breaks cannot be achieved.

Example 4 shows that, despite the presence of 1.2% of fumed silica, addition of 15.7% of matrix particles of monoclinic zirconia makes it possible to improve the resistance to thermal shock, which is contrary to the teaching of EP 0 404 610. However, example 4 does not meet criterion (3) concerning expansion breaks.

Examples 4 to 7 show the benefit of simultaneous addition of additional oxide particles, of fine silica particles and of more than 8% of matrix particles of monoclinic zirconia.

Comparison of examples 14 and 15 shows the importance, for improving the resistance to thermal shock, of adding at least 8% of matrix particles of monoclinic zirconia when the product also has $Y_2O_3$ particles, MgO particles and fine silica particles.

Comparison of examples 5 to 7 shows the remarkable effect of addition of CaO on reduction of the amplitude of the expansion break.

Comparison of examples 5 and 6 shows the remarkable effect of addition of MgO on improvement of mechanical strength at 20° C.

These two effects are confirmed for contents of additional oxide particles up to 5%, as shown by examples 8 to 10.

Comparison of examples 11 and 12 with examples 5 and 6 shows a very pronounced synergistic effect from simultaneous addition of MgO particles and $Y_2O_3$ particles. Thus, in cases when addition of CaO is not recommended, it is possible to reduce the value of the expansion break with limited additions of $Y_2O_3$ and MgO additional oxide particles.

To derive the maximum possible benefit from the advantageous properties of zirconia, the zirconia content must be as high as possible. That is why the content of additional oxide particles is limited, according to the present disclosure, to 5%. However, a minimum content of 0.3% is regarded as indispensable for these particles to have an appreciable effect.

Examples 11 and 12, and especially example 12, are the most preferred.

As is now clear, the present disclosure provides a novel powder making it possible to manufacture a material having good mechanical strength, thermal expansion behavior without any notable anomaly (or practically linear) and good resistance to thermal shock.

Of course, the present invention is not limited to the embodiments described, which are given for purposes of illustration.

The invention claimed is:

1. A powder including, in percentages by weight, based on oxides of:
   (a) more than 92% of zirconia particles, said powder comprising:
      (a1) more than 60% of zirconia particles having a size larger than 50 microns, called zirconia aggregate particles, wherein at least 90 wt. % of said zirconia aggregate particles containing less than 50 wt. % of monoclinic phase;
      (a2) more than 15% of zirconia particles having a size smaller than 50 µm, called matrix particles of zirconia;
   (b) 1% to 2% of silica particles having a size smaller than 50 microns, called fine silica particles;
   (c) 0.3% to 5% of particles consisting of one, two or three oxides selected from the group consisting of CaO, MgO and $Y_2O_3$ called additional oxide particles, wherein at least 55 wt. % of said additional particles have a size smaller than 50 µm; and
   (d) less than 1% of particles consisting of other oxides;
   said powder also being such that it comprises:
   more than 5% of zirconia aggregate particles which size is larger than 1 mm; and
   from 8% to 20% of matrix particles of zirconia having a size smaller than 15 µm and comprising, to more than 95% of their mass, a monoclinic phase, called matrix particles of monoclinic zirconia.

2. The powder according to claim 1, wherein the zirconia aggregate particles are fused particles.

3. The powder according to claim 1, wherein the matrix particles of monoclinic zirconia represent more than 11% and less than 16% of the weight of the powder.

4. The powder according to claim 1, wherein the additional oxide particles represent more than 1% and less than 2% of the weight of the powder.

5. The powder according to claim 1, wherein the additional oxide particles comprise $Y_2O_3$ particles and MgO particles.

6. The powder according to claim 5, comprising more than 0.2% and less than 0.8% of $Y_2O_3$ particles, and more than 0.9% and less than 1.5% of MgO particles.

7. The powder according to claim 1, comprising more than 60% of zirconia particles which size is smaller than 7 mm, as percentage by weight based on the oxides.

8. A method of preparing a powder, comprising:
   a) selecting a source of zirconia aggregate particles comprising at least 30 wt. % of zirconia particles which size is larger than 50 microns, called zirconia aggregate particles, wherein at least 90 wt. % of said zirconia aggregate particles contain less than 50 wt. % of monoclinic phase;
   b) selecting a source of zirconia matrix particles comprising at least 50 wt. % of zirconia particles which size is smaller than 50 µm, called matrix particles of zirconia;
   c) selecting a source of matrix particles of monoclinic zirconia comprising more than 50 wt. % of matrix particles of zirconia having a size smaller than 15 µm and comprising, to more than 95% of their mass, a monoclinic phase, called matrix particles of monoclinic zirconia;
   d) selecting a source of fine silica particles comprising at least 87 wt. % of silica particles which size is smaller than 50 µm, called fine silica particles;
   e) selecting a source of additional oxide particles comprising at least 87 wt. % of particles consisting of one, two or three oxides selected from the group consisting of CaO, MgO and $Y_2O_3$, called additional oxide particles, wherein at least 55 wt. % of said additional oxide particles have a size smaller than 50 µm; wherein
   the sources selected in step a), b) and c) each comprising at least 87 wt. % of zirconia; and
   f) preparing a powder comprising, in percentages by weight:
   at least 60% of said source of zirconia aggregate particles, the amount of said source of zirconia aggregate particles being determined moreover such that said powder comprises more than 5 wt. % of zirconia aggregate particles which size is larger than 1 mm;

between 8% and 31% of said source of matrix particles of monoclinic zirconia;

1% to 2% of said source of fine silica particles;

0.3% to 5% of said source of additional oxide particles; and the complement to 100% being said source of matrix particles of zirconia.

9. The method according to claim 8, wherein the sources are selected so as to prepare a powder including, in percentages by weight, based on oxides of:
   (a) more than 92% of zirconia particles, said powder comprising:
      (a1) more than 60% of zirconia particles having a size larger than 50 microns, called zirconia aggregate particles, wherein at least 90 wt. % of said zirconia aggregate particles containing less than 50 wt. % of monoclinic phase;
      (a2) more than 15% of zirconia particles having a size smaller than 50 μm, called matrix particles of zirconia;
   (b) 1% to 2% of silica particles having a size smaller than 50 microns, called fine silica particles;
   (c) 0.3% to 5% of particles consisting of one, two or three oxides selected from the group consisting of CaO, MgO and $Y_2O_3$, called additional oxide particles, wherein at least 55 wt. % of said additional particles have a size smaller than 50 μm; and
   (d) less than 1% of particles comprising other oxides:
      said powder also being such that it comprises:
   more than 5% of zirconia aggregate particles which size is larger than 1 mm; and
   from 8% to 20% of matrix particles of zirconia having a size smaller than 15 μm and comprising, to more than 95% of their mass, a monoclinic phase, called matrix particles of monoclinic zirconia.

10. A sintered refractory obtained by sintering a green part obtained from a powder according to claim 1 or manufactured by a method comprising:
   a) selecting a source of zirconia aggregate particles comprising at least 30 wt. % of zirconia particles which size is larger than 50 microns, wherein at least 90 wt. % of said zirconia aggregate particles contain less than 50 wt. % of monoclinic phase;
   b) selecting a source of zirconia matrix particles comprising at least 50 wt. % of zirconia particles which size is smaller than 50 μm, called matrix particles of zirconia;
   c) selecting a source of matrix particles of monoclinic zirconia comprising more than 50 wt. % of matrix particles of zirconia having a size smaller than 15 μm and comprising, to more than 95% of their mass, a monoclinic phase, called matrix particles of monoclinic zirconia;
   d) selecting a source of fine silica particles comprising at least 87 wt. % of silica particles which size is smaller than 50 μm, called fine silica particles;
   e) selecting a source of additional oxide particles comprising at least 87 wt% of particles consisting of one, two or three oxides selected from the group consisting of CaO, MgO and $Y_2O_3$, called additional oxide particles, wherein at least 55 wt. % of said additional oxide particles have a size smaller than 50 μm,
   the sources selected in step a), b) and c) each comprising at least 87 wt. % of zirconia; and
   f) preparing a powder comprising, in percentages by weight:
      at least 60% of said source of zirconia aggregate particles, the amount of said source of zirconia aggregate particles being determined moreover such that said powder comprises more than 5 wt. % of zirconia aggregate particles which size is larger than 1 mm;
      between 8% and 31% of said source of matrix particles of monoclinic zirconia;
      1% to 2% of said source of fine silica particles;
      0.3% to 5% of said source of additional oxide particles; and
      the complement to 100% being said source of matrix particles of zirconia.

11. An installation comprising:
   a wall and a barrier protecting said wall; and/or
   a means for directing a flow of a liquid or for hindering said flow,
   said barrier or said means for directing or hindering said flow comprising a refractory product according to claim 10 arranged in contact with an environment that may be corrosive and/or may create a thermal shock such that the temperature changes by at least 750° C. in less than 1 minute.

12. The installation according to claim 11, wherein the installation is selected from the group consisting of a reactor for manufacturing carbon black, equipment in the metallurgical industry, an incinerator, a glassmaking furnace, a petrochemical reactor and a cement kiln.

13. The powder according to claim 1, wherein more than 15% of the zirconia aggregate particles have a size greater than 1 mm, as percentage by weight based on the powder.

14. The powder according to claim 1, wherein more than 95 wt. % of the CaO particles and of the $Y_2O_3$ particles sizes are smaller than 20 μm.

15. The powder according to claim 1, wherein the content by weight of zirconia $ZrO_2$ is greater than 90%.

16. The powder according to claim 1, wherein the zirconia of the zirconia aggregate particles that comprise less than 50 wt. % of monoclinic phase is partially stabilized or fully stabilized with magnesia MgO and/or with lime CaO.

17. The powder according to claim 4, wherein said zirconia is stabilized at least partly with magnesia, the content by weight of magnesia being between 2.9% and 4.5%.

* * * * *